(12) United States Patent
Escobar-Bowser et al.

(10) Patent No.: US 7,642,819 B1
(45) Date of Patent: Jan. 5, 2010

(54) HIGH SPEED CURRENT MODE WRITE DRIVER

(75) Inventors: Priscilla E. Escobar-Bowser, Plano, TX (US); Indumini Ranmuthu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/191,885

(22) Filed: Aug. 14, 2008

(51) Int. Cl.
*H03B 1/00* (2006.01)
(52) U.S. Cl. .................................................. 327/110
(58) Field of Classification Search .......... 327/108–112
See application file for complete search history.

(56) References Cited

U.S. PATENT DOCUMENTS

| | | | |
|---|---|---|---|
| 5,751,171 A | 5/1998 | Ngo | |
| 6,005,316 A * | 12/1999 | Harris | 310/90.5 |
| 6,175,463 B1 * | 1/2001 | Nayebi et al. | 360/68 |
| 6,977,533 B2 * | 12/2005 | Kernhof et al. | 327/110 |
| 7,206,155 B2 | 4/2007 | Kuehlwein et al. | |
| 7,292,087 B2 * | 11/2007 | Cappon | 327/423 |

* cited by examiner

*Primary Examiner*—Lincoln Donovan
*Assistant Examiner*—William Hernandez
(74) *Attorney, Agent, or Firm*—Dawn V. Stephens; Wade James Brady, III; Frederick J. Telecky, Jr.

(57) ABSTRACT

An integrated circuit (100) includes a current mode write driver (105). The write driver (105) includes a switching control circuit (110) including (i) a DC current control circuit (111) operable to directly convert a received ECL differential signal into first, second, third and fourth DC output currents (a, b, c, and d) and (ii) a boost current control circuit (112) operable to directly convert a received level shifted version of the ECL differential voltage signal and a delayed version of the ECL differential voltage signal into first, second, third and fourth boost output currents (a1, b1, c1, and d1). An H-bridge circuit (120) includes an output stage (125) including first and second current sourcing control nodes (126, 127) and first and second current sinking control nodes (128, 129). A first output node (131) is between the first sourcing and first sinking nodes (126, 128) and second output node between the second sourcing and the second sinking nodes (127, 129). A first, second, third and fourth current mirror including input is coupled to sourcing or sinking control nodes (126, 127, 128, and 129) and are each operable to receive one of the DC output currents and one of the boost output currents for switchably delivering current diagonally through a load (145) connected between the output nodes (131, 132).

17 Claims, 6 Drawing Sheets

HIGH SPEED CURRENT MODE WRITE DRIVER

FIELD OF THE INVENTION

The present invention relates to integrated circuits. In particular, the present invention relates to current mode write drivers for driving a two terminal inductive or resistive load, such as for hard disk drive (HDD) applications.

BACKGROUND

Almost all business and home computers use a HDD storage system for mass storage requirements. A HDD stores data by individually modifying the magnetic orientation of small regions of a disk surface. A HDD typically includes one or more rotating disks. A head assembly associated with each surface of the disks typically includes separate read and write heads for reading data from the disk and writing data to the disk. The write head is essentially a small coil of wire which stores data by magnetizing small regions along a disk's tracks. During a write operation a current driven through the write head in a first direction magnetizes a small region of the disk under the head at a first orientation and a current driven through the write head in the opposite direction magnetizes a small region of the disk under the head at a second orientation. During a read operation, the read head distinguishes the magnetic orientation of each bit location to derive logical "1s" and "0s".

The circuit which drives the write head is commonly referred to as a "write driver" which is generally a part of the read/write preamplifier circuit. The write driver controls the direction and timing of the flow of current flowing through the inductive write head, responsive to information received from circuitry commonly referred to as channel circuitry. The channel circuitry generally receives data from the hard drive controller of a computer.

Write drivers drive the write head differentially to achieve the maximum voltage possible across the write head for both positive and negative transitions. The requirement of driving the write head differentially means that both sides of the write driver must have bidirectional current drive capability.

As the frequency of the write driver current pulses is increased, so does the density of the stored data. Since it is desirable to increase the density of stored data, it is likewise desirable to increase the frequency of the current write pulses. The time required for the current to change from its present value to its next value (rise and fall times) ultimately limits the frequency of the current write pulses, therefore it is desirable to reduce the rise and fall times. Accordingly, if the rise/fall speed of the current applied to the write head increases, the writing speed increases.

Pulse switching write drivers generally operate in an open loop configuration for highest speed. For such open loop drivers it is very difficult to prevent saturation and cutoff of the H-bridge transistors as switching occurs. Low power coupled with high switching speed often results in dead bands and saturated H-bridge transistors which become sluggish as they recover from the present state to become able to deliver power to the inductive load presented by the write head responsive to the subsequent switching pulse. New write driver designs are needed that provide higher switching speed, while at the same time providing low power operation.

SUMMARY

This Summary is provided to comply with 37 C.F.R. §1.73, presenting a summary of the invention to briefly indicate the nature and substance of the invention. It is submitted with the understanding that it will not be used to interpret or limit the scope or meaning of the claims.

Embodiments of the invention provide integrated circuits including current mode write drivers which operate in current mode throughout, so that voltage conversions are not generally needed. Dead bands and saturated H-bridge transistors that are characteristic of conventional designs are generally eliminated. Current mode write drivers according to embodiments of the invention generally provide high switching speed, while at the same time providing low power operation. Write drivers according to embodiments of the invention directly convert voltages (e.g. ECL voltages) received into currents that are delivered to the load, which can be distinguished from conventional current mode write drivers which convert voltages received to currents then to voltages and back to currents for delivery to the load. As used herein, "directly convert" refers to only one voltage to current translation (e.g. ECL voltage signal into a bipolar transistor base and the current out from the collector of the same transistor) as opposed to a voltage to current to voltage to current translation that is the architecture used in conventional current mode write drivers.

Current mode write drivers according to an embodiment of the invention include a switching control circuit comprising (i) a DC current control circuit operable to directly convert a received ECL differential voltage signal into first, second, third and fourth DC output currents, and (ii) a boost current control circuit operable to directly convert a received level shifted version of the ECL differential voltage signal and a delayed version of the ECL differential voltage signal into first, second, third and fourth boost output currents.

An H-bridge circuit comprises an output stage including first and second current sourcing control nodes and first and second current sinking control nodes. A first output node is between the first sourcing and first sinking control node and a second output node is between the second sourcing and second sinking control node. A first, second, third and fourth current mirror comprising input is each coupled to one of the current sourcing and current sinking control nodes and is operable to receive one of the DC output currents and one of the boost output currents for switchably delivering current diagonally through the load.

Another embodiment of the invention comprises a switching control circuit. The switching control circuit comprises a (i) DC current control circuit operable to directly convert a received ECL differential voltage signal into first, second, third and fourth DC output currents, and (ii) a boost current control circuit operable to directly convert a received level shifted version of the ECL differential voltage signal and a delayed version of the ECL differential voltage signal into first, second, third and fourth boost output currents.

DETAILED DESCRIPTION

Figure 1A:
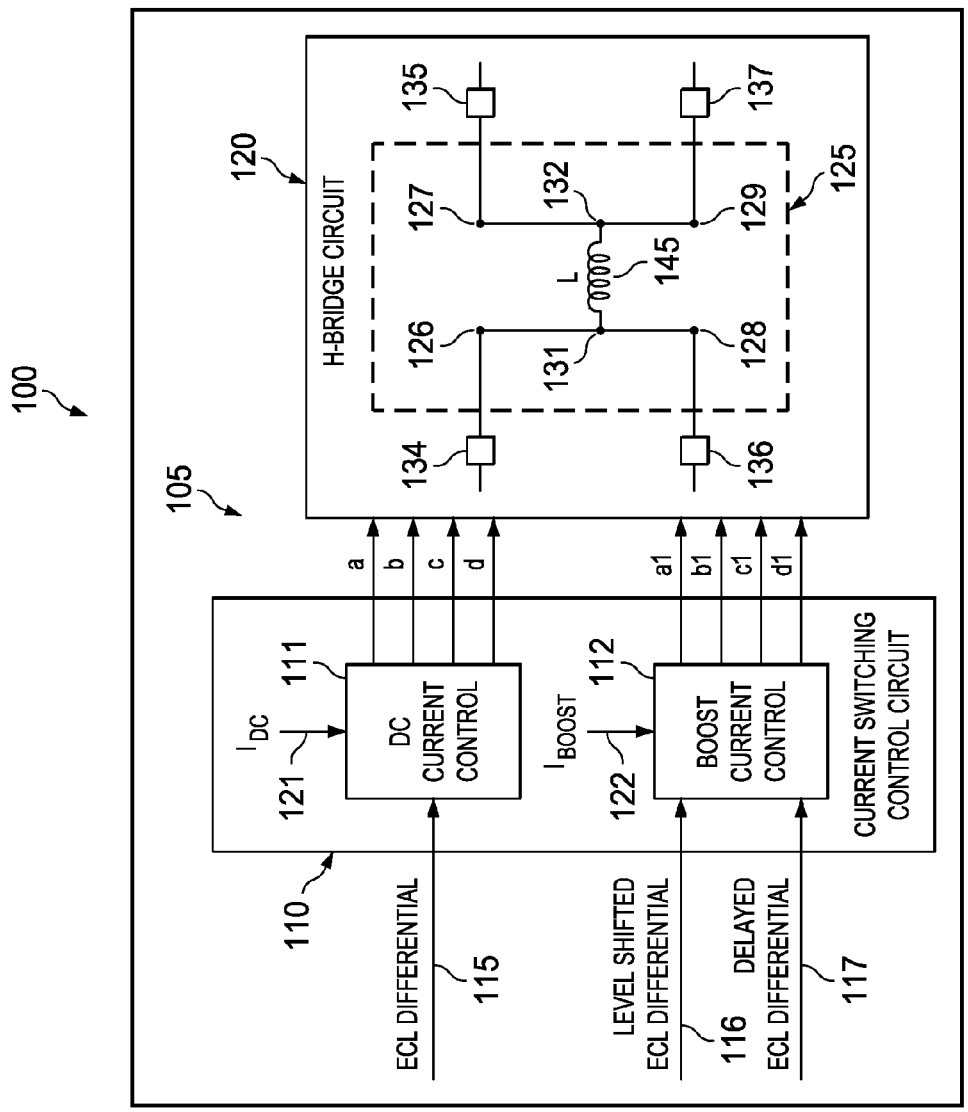
FIG. 1A is a block diagram of an integrated circuit including a current mode write driver according to a first embodiment of the invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

One embodiment of the invention comprises an integrated circuit including a current mode write driver which operates in current mode throughout, so that voltage conversions are not generally needed. Dead bands and saturated H-bridge transistors are thus generally eliminated.

Referring to FIG. 1A, a block diagram of an integrated circuit 100 including a current mode write driver 105 according to a first embodiment of the invention is shown. The current mode write driver 105 comprises a switching control circuit 110. The control circuit 110 includes a DC current control circuit 111 operable to directly convert a received ECL differential signal voltage 115 into first, second, third and fourth DC output currents a, b, c and d. A boost current control circuit 112 is operable to directly convert a received level shifted version of the ECL differential voltage signal 116 and a delayed version of the ECL differential voltage signal 117 into first, second, third and fourth boost output currents a1, b1, c1, and d1.

As known in the art, level shifted versions and delayed version of ECL differential voltage signals can be generated by delay and signal circuitry, which generally comprises a plurality of delay and signal ECL buffers. The delay and signal circuitry generally receive the true ECL signals from the channel circuit after being driven by an ECL driver. In one embodiment, as described below relative to FIGS. 2A and 2B, the level shifting provides a level shifted up (LSU) signal that is two (2) diodes up from the true ECL differential voltage signal and a level shifted down (LSD) signal that is two (2) diodes down from the true ECL differential voltage signal. The delay circuitry in the delay and signal circuitry is generally programmable.

The write driver 105 also comprises an H-bridge circuit 120 coupled to receive the DC output currents (a, b, c and d) and boostoutput currents (a1, b1, c1 and d1) provided by the switching control circuit 110. H-bridge circuit 120 comprises an output stage that includes first and second current sourcing control nodes 126, 127 and first and second current sinking control nodes 128, 129, and a first output node 131 between the first sourcing and first sinking control nodes 126, 128 and second output node 132 between the second sourcing and second sinking control nodes 127, 129. A first, second, third and fourth current mirror 134, 135, 136, and 137 comprising input are coupled to first sourcing control node 126, second sourcing control node 127, first sinking control node 128 and second sinking control node 129, respectively, and are operable to receive one of the DC output currents (a, b, c and d) and one of the boost output currents (a1, b1, e1 and d1) for switchably delivering current diagonally through the load 145, shown as an inductive load.

Figure 1B:
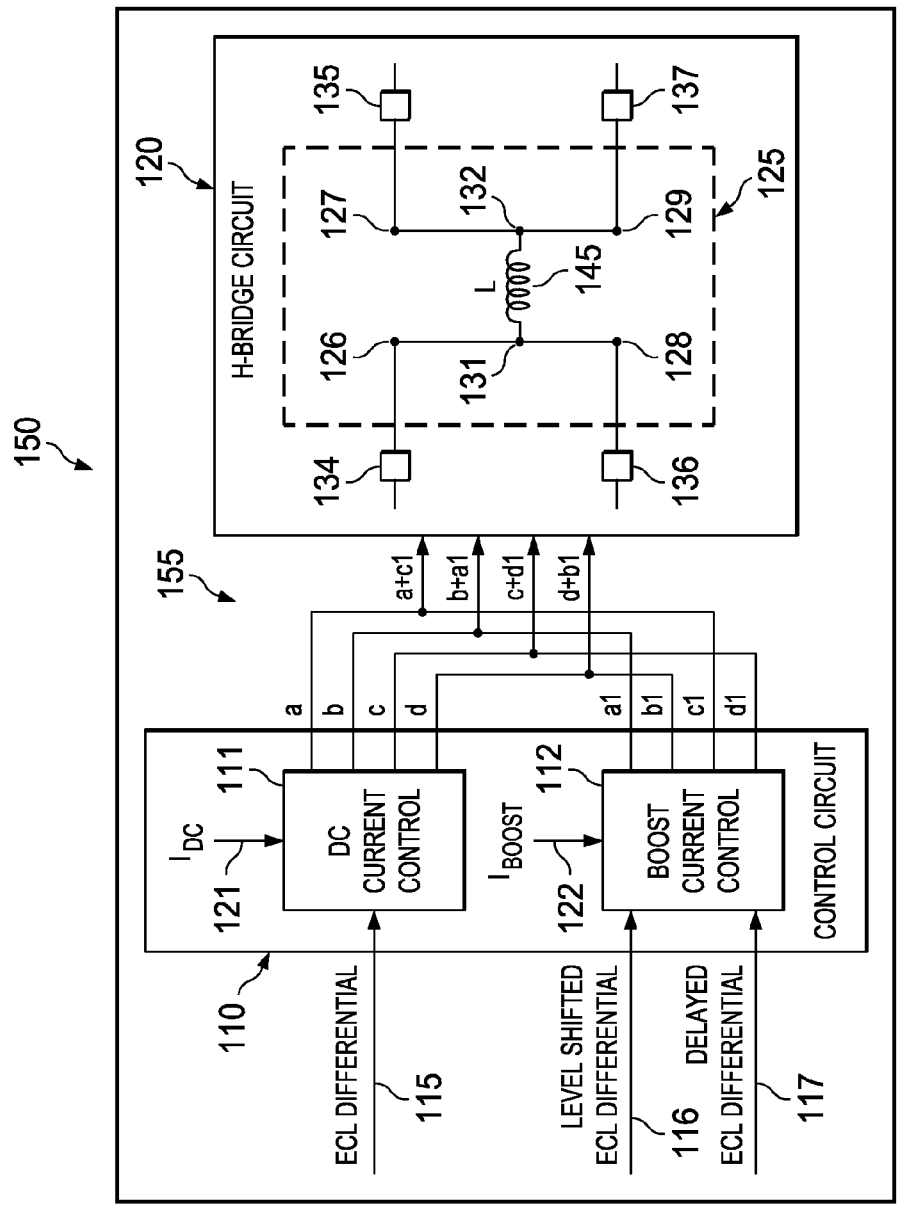
FIG. 1B is a block diagram of an integrated circuit including a current mode write driver according to a second embodiment of the invention.

FIG. 1B is a block diagram of an integrated circuit 150 including a current mode write driver 155 according to a second embodiment of the invention. Instead of coupling eight total currents comprising DC output currents (a, b, c and d) and boost output currents (a1, b1, c1 and d1) to the H-bridge circuit 120, current mode write driver 155 combines current pairs comprising a DC output current and a boost output current. Combinations can be provided by simply tying collectors together or other combining techniques known in the art. One advantage of the current combination provided by current mode write driver 155 is that the H-bridge circuit can be embodied with a single current mirror per control node 126, 127, 128 and 129, as compared to separate current mirrors for the DC output current and the boost output current per node that is generally implemented for receiving the separate DC and boost output currents by current mode write driver 105.

Figures 1, 2A:
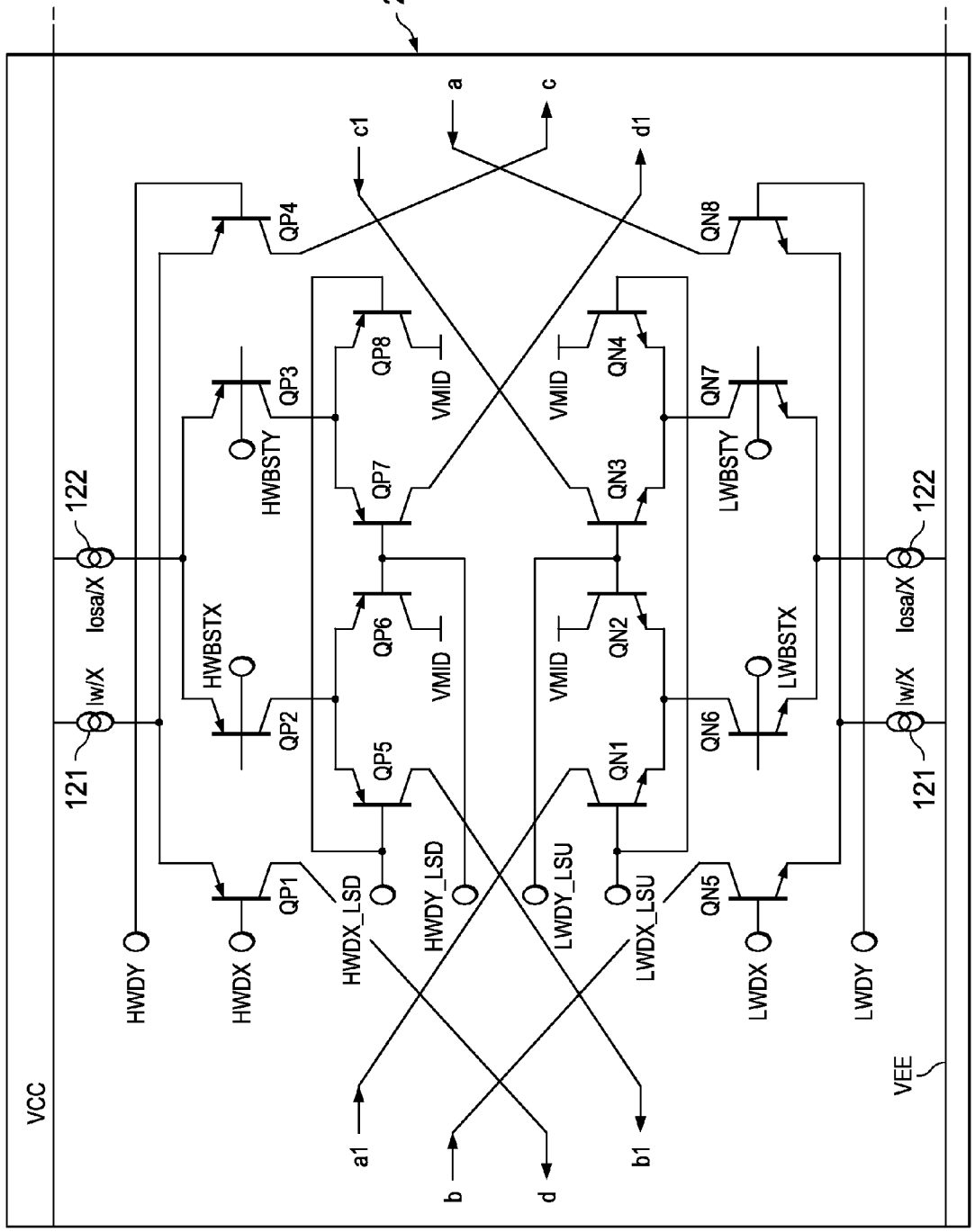
FIG. 2A is a schematic of an exemplary current mode write driver implementation according to the first embodiment of the invention.
Figures 2, 2A:
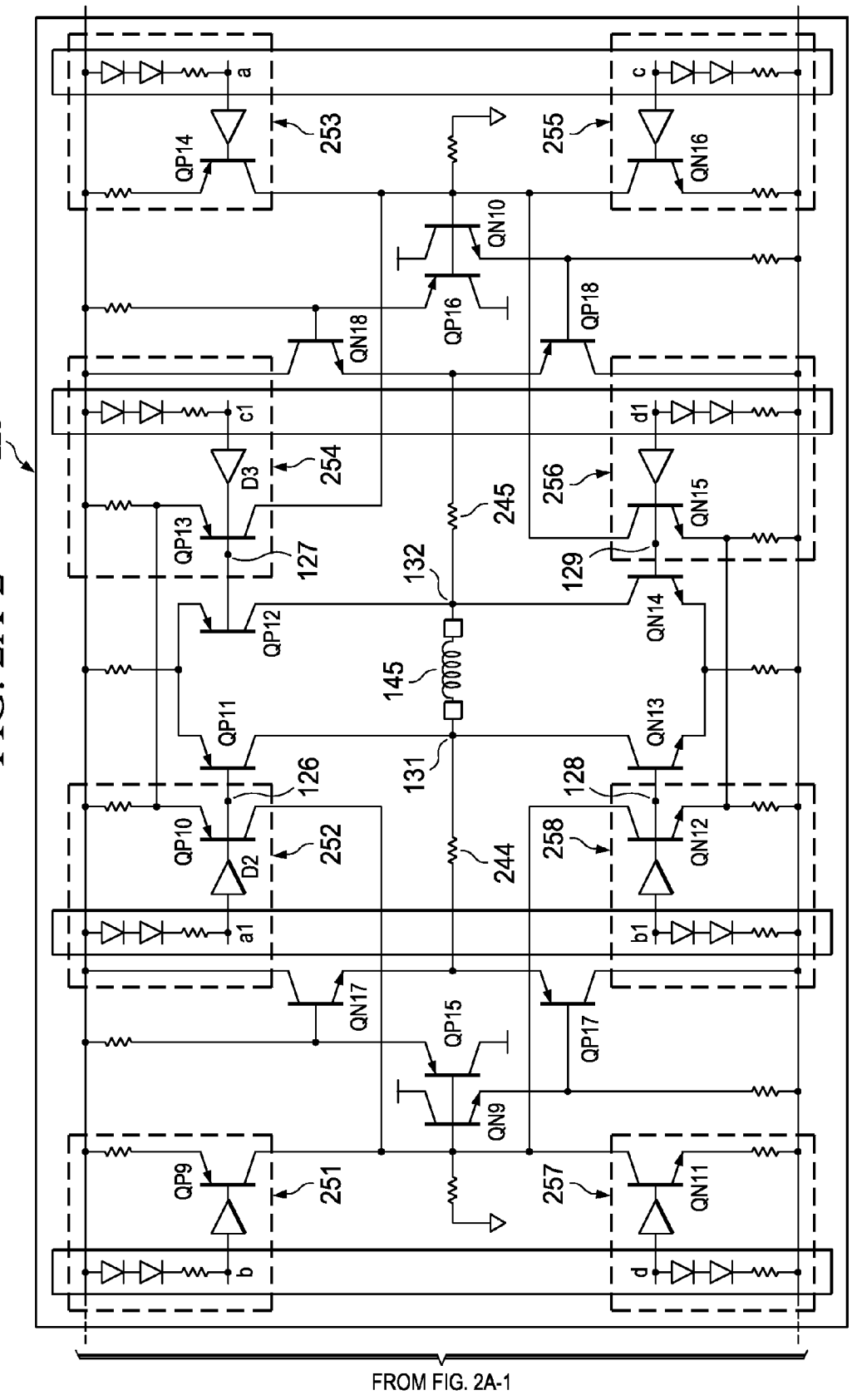

FIG. 2A is a schematic of an exemplary current mode write driver 200 implementation according to the first embodiment of the invention described above relative to FIG. 1A. The current mode write driver 200 comprises a switching control circuit 210. The control circuit 210 shown includes DC current control circuitry (implementing a first embodiment for DC current control circuitry 111 shown in FIG. 1A) and boost current control circuitry (implementing a first embodiment of boost current control circuitry 112 shown in FIG. 1A). As described below, control circuit 210 provides at least six (6) translinear loops, identified as loops 1, 2, 3, 4, 5 and 6. The DC current control circuitry provides a translinear loop (referred to below as loop 1) for controlling the respective DC currents output (a, b, c and d) while the boost current control circuitry provides at least five (5) additional translinear loops (referred to below as loops 2-6) for controlling the boost output currents (a1, b1, c1, and d1) provided. It can be seen that apart from pnp's on the top half and npn's on the bottom half of control circuit 210, the top half circuitry and bottom half circuitry are both mirror images of one another.

The DC current control portion of switching control circuit comprises a first differential pair QP1/QP4 and a second differential transistor pair QN5/QN8 both biased by a DC current source 121, with the boost control portion comprising the remaining circuitry shown in FIG. 2A.

The first differential pair QP1/QP4 is operable to receive a true (neither voltage shifted nor delayed) differential voltage signal shown as HWDX and HWDY, such as provided by a channel circuit (not shown) after being driven by an ECL driver circuit (not shown). The second differential transistor pair QN5/QN8 receives the same true differential voltage signal shown as HWDX and HWDY (which are referred to the lower supply rail VEE). As a result of the common input signals applied, one having ordinary skill in the art will recognize that QN5, QP1, QP4 and QN8 form a first translinear loop (loop 1) that adds dynamic coordination between the respective DC currents a, b, c and d output by switching control circuit 210. For example) if WDX drops from a previous level by 15 mV to reach a new level, the output current b provided by QN5 decreases and the output current d provided by QP1 increases by essentially the same amount since HWDX and LWDX are signals which are level shifted from WDX. At the same time, since WDY is a complementary signal relative to WDX, the output current c provided by QP4 decreases and output current a provided by QN8 increases, respectively.

The collectors QN8, QN5, QP4 and QP1, provide DC output currents a, b, c and d, respectively. QN5, QP1, QP4 and QN8 thus directly convert ECL differential voltage signals received into DC output currents since each translation involves only a voltage input signal into the base of a bipolar transistor and the current out from the collector of the same transistor.

The boost current control portion of switching control circuit 210 comprises a differential pair comprising QP2 and QP3, which is shown biased by boost current source 122, shown as Iosa/x. The "osa" refers to overshoot amplitude and relates to the overshoot portion the resulting current waveform provide by the combination of the DC output current portion and the boost current portion (Iosa/x), while the "x" refers to the current being divided down relative to the current ultimately delivered to the load 145. The differential inputs HWBSTX and HWBSTY shown coupled to QP2 and QP3 are delayed versions of the true differential input signal WDX and WDY. As described above, HWBSTX and HWBSTY can be provided by suitable delay and signal circuitry. In FIG. 2A, regarding the input signals, the prefix "H" refers to input signals applied to the top half circuitry of control circuit 210, while "L" refers to the same signals that are applied to the bottom half circuitry of control circuit 210.

The top half of boost current control portion of control circuit 210 also comprises differential pair QP5 and QP6 and differential pair QP7 and QP8. The bases of QP6 and QP7 are coupled together as are the bases of QP5 and QP8 to form a second translinear loop comprising QP5, QP6, QP7 and QP8 (loop 2). A level shifted down version of the true differential signal WDX, WDY, shown as HWDX_LSD and HWXY_LSD, are coupled to the base of QP5 and QP8 and the base of QP6 and QP7, respectively. In the embodiment shown in FIG. 2A, the level shifting is two (2) diode drops in magnitude. As described above, HWDX_LSD and HWXY_LSD can be provided by suitable delay and signal circuitry. Boost output current b1 is shown provided by the collector of QP5 while boost output current d1 is shown provided by the collector of QP7.

The collectors of QP6 and QP8 are coupled to a power supply, shown as Vmid, that sets a voltage level somewhere between VCC and VEE (e.g. −1, 0 or +1 volts). In one embodiment, Vmid is set to 1 volt, being the midpoint of VCC=5 volts and VEE=−3 volts.

The bottom half of boost current control portion of control circuit 210 comprises differential inputs shown coupled to QP2 and QP3 are the delayed versions (HWBSTX and HWBSTY) of the true differential input signal WDX and WDY.

Differential pair QN1 and QN2 and differential pair QN3 and QN4 are also provided. The collectors of QN2 and QN4 are shown coupled to a power supply, shown as Vmid, described above. The bases of QN2 and QN3 are coupled together as are the bases of QN4 and QN1 to form another translinear loop comprising QN1, QN2, QN3 and QN4 (loop 3). Level shifted up versions of the true differential signal WDX, WDY, shown as LWDX_LSU and LWXY_LSU are coupled to the bases of QN1 and QN4 and the bases of QN2 and QN3, respectively. A boost output current a1 is shown provided by the collector of QN1 while boost output current c1 is shown provided by the collector of QN3.

Loop 4 in boost current control portion of control circuit 210 comprises QN1, QP5, QP6, and QN2. Loop 5 in boost current control portion of control circuit 210 comprises QN3, QP7, QP8, and QN4. Loop 6 in boost current control portion of control circuit 210 comprises QN6, QP2, QP3, and QN 7.

The interrelation of loops 1-6 during operation of control circuit 210 is described below. loop 1 (driven by QP1, QP4, QN5, QN8) is associated with control of DC output currents a, b, c and d. Loops 2, 3, 4 and 5 which are described above control the boost leading edges of the output current waveforms. Loop 6 controls the boost trailing edges of the output current waveforms. HWX and HWY signals are common to all these loops and all these loops depend on the timing of HWX HWY signals. Thus the timing of currents a, b, c, d, a1, b1, c1, d1 are synchronized to one another.

H-Bridge circuit 220 is an exemplary H-bridge circuit implementation that includes a current mirror for the DC current received from switching control circuit 210 and a separate current mirror for the boost current received from switching control circuit 210 for each corner of the H-bridge 220, comprising first and second current sourcing control nodes (126, 127) and first and second current sinking control nodes (128, 129). Associated with first current sourcing control node 126, current mirror 251 receives DC output current b and current mirror 252 receives boost output current a1. Current mirror 251 comprises QP9 which receives the DC output current b from the control circuit 110 on its reference side. The collector of QP9 is coupled to the collector of QP10 as well as the collector of QN12. Current mirror 252 comprises QP10 and receives boost output current a1 from control circuit 210 on its reference side.

Similar to control node 126, the other control nodes 127, 128 and 129 can be seen to receive the DC and boost currents on the reference side of separate current mirrors. Associated with second current sourcing control node 127, current mirror 253 (comprising QP14) receives DC output current a and current mirror 254 (comprising QP13), receives boost output current c1. Associated with first current sinking control node 128, current mirror 257 (comprising QN11) receives DC output current d and current mirror 258 (comprising QN12) receives boost output current b1. Associated with second current sinking control node 129, current mirror 255 (comprising QN16) receives DC output current c and current mirror 256 (comprising QN15), receives boost output current d1.

H-Bridge circuit 220 shown comprises the H-bridge output transistors comprising PNP differential pair QP11 and QP12 having the respective collectors coupled to the collectors of a NPN differential pair QN13 and QN14. First and second output nodes 131 and 132 are shown at the common nodes between the PNP differential pair QP11/QP12 and NPN differential pair QN13/QN14. QP11 and QN14 are operable for providing current in one diagonal path when a load 145 (shown as an inductive load) is coupled between nodes 131 and 132, while QP13 and QN13 are operable for providing current in the other diagonal path across nodes 131 and 132. Impedance match resistors 244 and 245 are also provided.

A translinear loop is provided by QN9/QP15, QN17 and QP17. Similarly, another translinear loop is provided by QN10/QP16, QN18 and QP18. As understood by one having ordinary skill in the art, these translinear loops taken together with associated circuitry shown constitute class-AB drivers.

Figures 1, 2B:
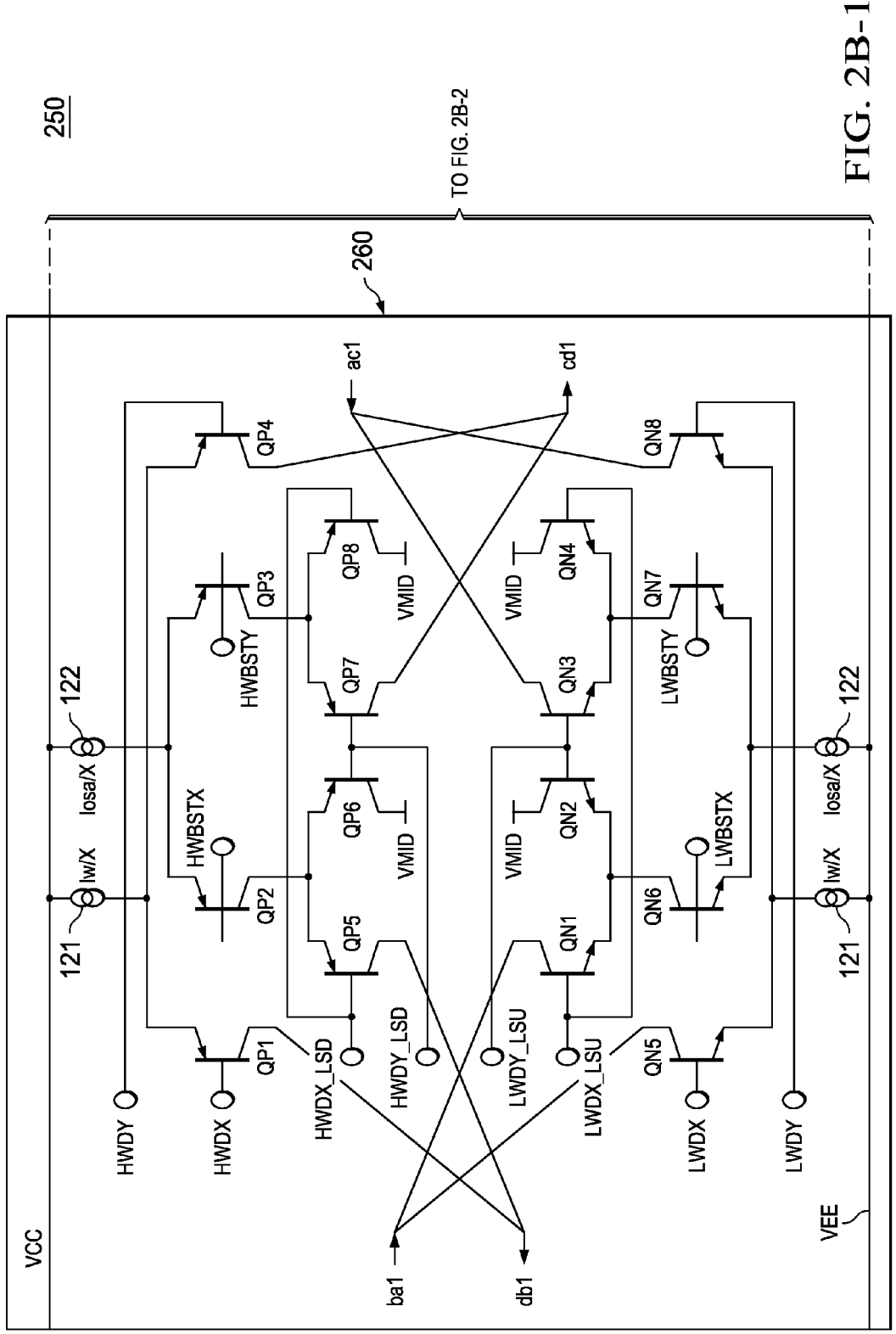
FIG. 2B is a schematic of an exemplary current mode write driver implementation according to the second embodiment of the invention.
Figures 2, 2B:
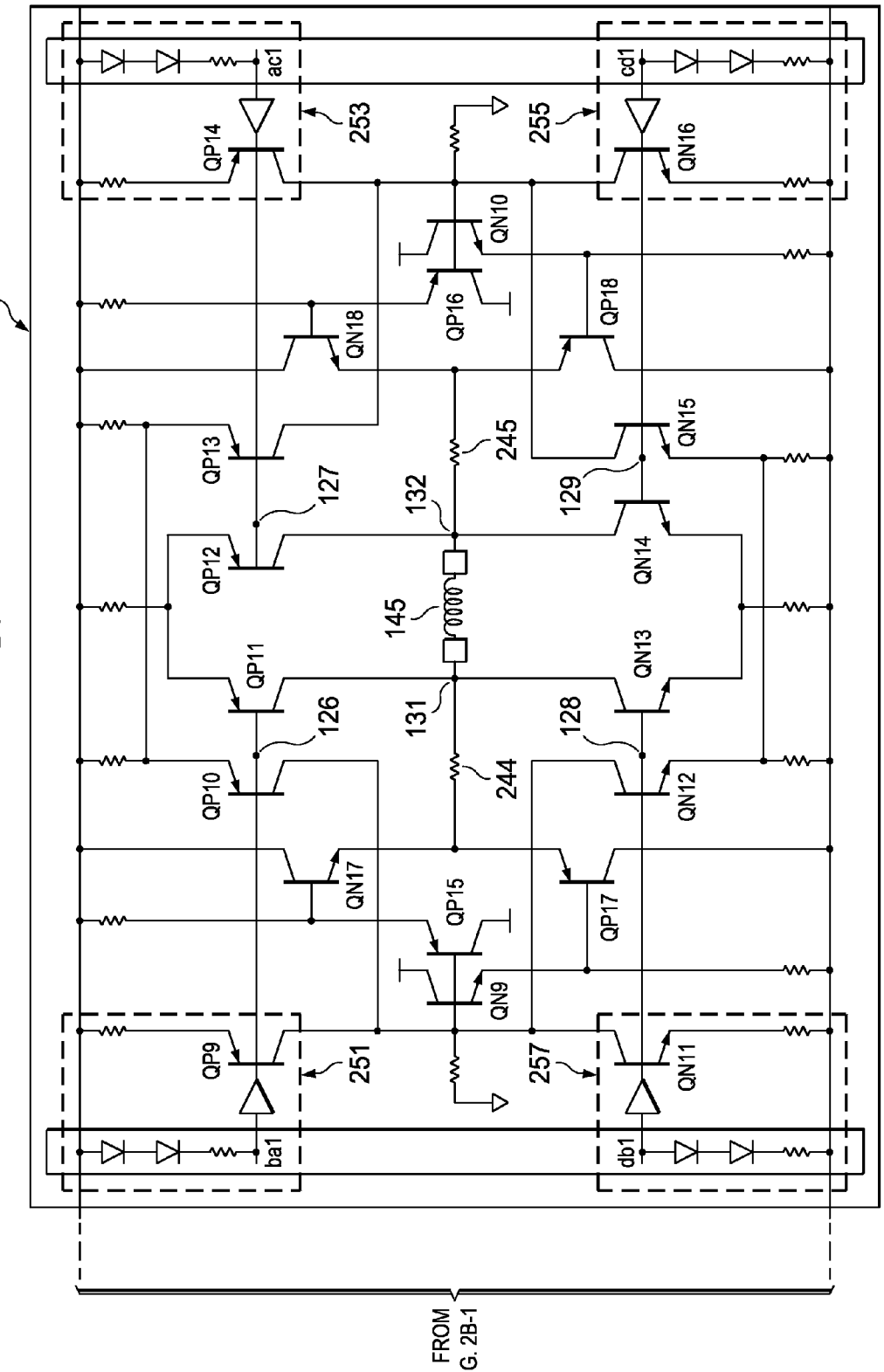

FIG. 2B is a schematic of an exemplary current mode write driver implementation 250 according to the second embodiment of the invention. The current mode write driver 250 comprises a switching control circuit 260 that includes the same circuitry shown for switching control circuit 210 in FIG. 2A, but includes tying of DC and boost current pairs. One technique for tying the respective currents is coupling collectors as shown above in FIG. 2A. Enabled by the combination of DC and boost currents provided by control circuit 260, the corresponding H-Bridge circuit 270 can be embodied with a single current mirror per current control node (126, 127, 128, and 129). Current mirror 251 described above relative to FIG. 2A is associated with control node 126, current mirror 253 described above relative to FIG. 2A is associated with control node 127, current mirror 257 described above relative to FIG. 2A is associated with control node 128, and current mirror 255 described above relative to FIG. 2A is associated with control node 129.

Regarding the operation of write driver 200 or write driver 250, the current switching control circuit 210 or 260 being exclusively ECL circuitry operates in current mode all the way through the signal path. Since the transistors in the signal path of switching control circuit 210 or 260 are generally always on, the write driver does not generally experience any dead bands between either the boost paths or the DC paths.

As described above, the respective translinear loops 1-6 in the current control circuit work together. This allows timing of currents a, b, c, d, a1, b1, c1, d1 to be sysncronized together which leads to lower jitter of the output waveform.

Power dissipation for write drivers according to embodiments of the invention are also generally low. Low power is provided by using only the IW/X (121) and IOSA/X (122) current sources to operate the switching control circuit. No additional current sources are required. Thus, for an 8 V supply voltage range, the power consumption of the switching control circuit is (Iosa/X+Iw/X)*8V.

Advantages provided by write drivers according to embodiments of the invention include higher speed, high linearity, and low power as compared to conventional current mode write drivers. Although described for driving a single write head, write drivers according to embodiments of the invention can be used to drive a plurality of write heads. Moreover, driver circuits based on embodiments of the invention are not limited to write drivers for HDD applications. For example, drivers according to embodiments of the invention can be used to drive other inductive and resistive comprising loads, including motors and certain audio devices.

EXAMPLES

The following non-limiting Examples serve to illustrate selected embodiments of the invention. It will be appreciated that variations in proportions and alternatives in elements of the components shown will be apparent to those skilled in the art and are within the scope of embodiments of the present invention.

Simulations were preformed to generate eye patterns and minimum duration data for the write driver 200 shown in FIG. 2A as compared to a conventional current mode write driver that as described above performs input voltage to current to voltage to write current. Inputs were 300 mV ECL signals. The data rate for write driver 200 was found to be double the data rate for this conventional write driver.

These are but a few examples. Accordingly, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and/or the claims, such terms are intended to be inclusive in a manner similar to the term "comprising."

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

The invention claimed is:

1. An integrated circuit including a current mode write driver, said write driver comprising:

a switching control circuit comprising (i) a DC current control circuit operable to directly convert a received ECL differential voltage signal into first, second, third and fourth DC output currents, and (ii) a boost current control circuit operable to directly convert a received level shifted version of said ECL differential voltage signal and a delayed version of said ECL differential voltage signal into first, second, third and fourth boost output currents, and an H-bridge circuit comprising an output stage including first and second current sourcing nodes and first and second current sinking control nodes, a first output node between said first sourcing and said first sinking control nodes and second output node between said second sourcing and said second sinking nodes, and a first, second, third and fourth current mirror comprising input each coupled to one of said sourcing or said sinking control nodes operable to receive one of said DC output currents and one of said boost output currents for switchably delivering current diagonally through a load connect between said first and second output nodes.

2. The integrated circuit of claim 1, wherein said DC current control circuit comprises a first translinear loop.

3. The integrated circuit of claim 1, wherein said boost current control circuit includes comprises a plurality of boost leading edge controlling translinear loops and a boost falling edge controlling translinear loop.

4. The integrated circuit of claim 1, wherein said first, second, third and fourth DC output currents and said first, second, third and fourth boost currents are controlled by a single translinear based on coupling of common ones of said ECL differential voltage signals.

5. The integrated circuit of claim 1, wherein output current combinations comprising one of said DC output currents and one of said boost output currents tied together are coupled to each said first, seconds third and fourth current mirrors.

6. The integrated circuit of claim 1, wherein said current pairs are coupled to a reference side of each of said first, second, third and fourth current mirrors.

7. The integrated circuit of claim 1, further comprising an additional current mirror coupled to each of current sinking control nodes and current sourcing control nodes, wherein one of said DC output currents and one of said boost output currents are coupled to one of said additional current mirrors and one of said a first, second, third and fourth current mirror for each of said current sinking control nodes and said current sourcing control nodes.

8. The integrated circuit of claim 7, wherein said DC output currents and said boost output currents are coupled to a reference side of said additional current mirrors and said first, second, third and fourth current mirrors.

9. The integrated circuit of claim 1, wherein said H-bridge comprises first and second translinear loop circuitry resistively coupled to said first and said second output nodes for providing AB-drive.

10. An integrated circuit including a current mode write driver, said write driver comprising:
   a switching control circuit comprising (i) a DC current control circuit comprising a first and a second differential transistor pair arranged in a first translinear loop biased by a DC current source operable to receive an ECL differential voltage signal, wherein collectors of said first and said second differential pairs directly convert said ECL differential signal into first, second, third and fourth DC output currents, and (ii) a boost current control portion comprising a plurality of differential transistor pairs biased by a boost current source, said boost current control circuit operable to receive a level shifted version of said ECL differential voltage signal and a delayed version of said ECL differential voltage signal across its respective bases and directly convert said level shifted and said delayed ECL differential voltage signals into first, second, third and fourth boost output currents, and
   an H-bridge circuit comprising an output stage including first and second current sourcing nodes and first and second current sinking control nodes, a first output node between said first sourcing and said first sinking control nodes and second output node between said second sourcing and said second sinking nodes, and a first, second, third and fourth current mirror comprising input each coupled to one of said sourcing or said sinking control nodes operable to receive at its reference side one of said DC output currents and one of said boost output currents for switchably delivering current diagonally through a load connect between said first and second output nodes.

11. The integrated circuit of claim 10, further comprising an additional current mirror coupled to each of current sinking control nodes and current sourcing control nodes, wherein one of said DC output currents and one of said boost output currents are coupled to one of said additional current mirrors and one of said a first, second, third and fourth current mirror for each of said current sinking control nodes and said current sourcing control nodes.

12. The integrated circuit of claim 10, wherein said boost current control circuit includes comprises a plurality of boost leading edge controlling translinear loops and a boost falling edge controlling translinear loop.

13. The integrated circuit of claim 10, wherein said first, second, third and fourth DC output currents and said first, second, third and fourth boost currents are controlled by a single translinear based on coupling of common ones of said ECL differential voltage signals.

14. A method for bidirectionally driving current through a load, comprising:
   providing a plurality of ECL differential voltage signals comprising a true ECL differential voltage signal, at least one delayed ECL voltage signals and at least one level shifted ECL voltage signals;
   converting said plurality of ECL differential voltage signals to a plurality of DC and a plurality of AC current output signals, wherein said converting consists of a single voltage to current translation, and
   coupling said plurality of DC and said plurality of AC current output signals to circuitry operable to drive said load.

15. The method of claim 14, wherein said circuitry comprises H-bridge circuitry.

16. The method of claim 14, wherein said load comprises an inductive load.

17. The method of claim 16, wherein said circuitry comprises H-bridge circuitry and said inductive load comprises a write head associated with a hard disk drive (HDD) apparatus.

* * * * *